(12) United States Patent
Murphy et al.

(10) Patent No.: US 6,226,744 B1
(45) Date of Patent: May 1, 2001

(54) METHOD AND APPARATUS FOR AUTHENTICATING USERS ON A NETWORK USING A SMART CARD

(75) Inventors: Michael V. Murphy, Guilford, IN (US); Earle H. West, Morganville, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 08/947,616

(22) Filed: Oct. 9, 1997

(51) Int. Cl.[7] .................................................. G06F 12/14
(52) U.S. Cl. .............................................................. 713/200
(58) Field of Search ...................... 380/4, 21, 25, 380/30, 49, 204, 223; 713/200, 201, 202; 709/229

(56) References Cited

U.S. PATENT DOCUMENTS 5,590,199 * 12/1996 Krajewski, Jr. et al. ................ 380/4
5,850,442 * 12/1998 Muftic ..................................... 380/21
5,892,900 *  4/1999 Ginter et al. .......................... 713/200

* cited by examiner

Primary Examiner—James P. Trammell
Assistant Examiner—Pierre E. Elisca

(57) ABSTRACT

A method and apparatus for authenticating a user over a network, with the network having a client computer and a server computer, and the client computer having a smart card and a smart card reader. The client sends a request to the server to access restricted information stored by the server. The server sends a smart card interface module to the client. The server requests an access code from the user to access the smart card. Once the server receives the access code, the server accesses user information stored on the smart card utilizing the program and the access code. The server compares the user information with authentication information available to the server but not the client. If the user information matches the authentication information, the server grants the client access to the restricted information.

23 Claims, 4 Drawing Sheets

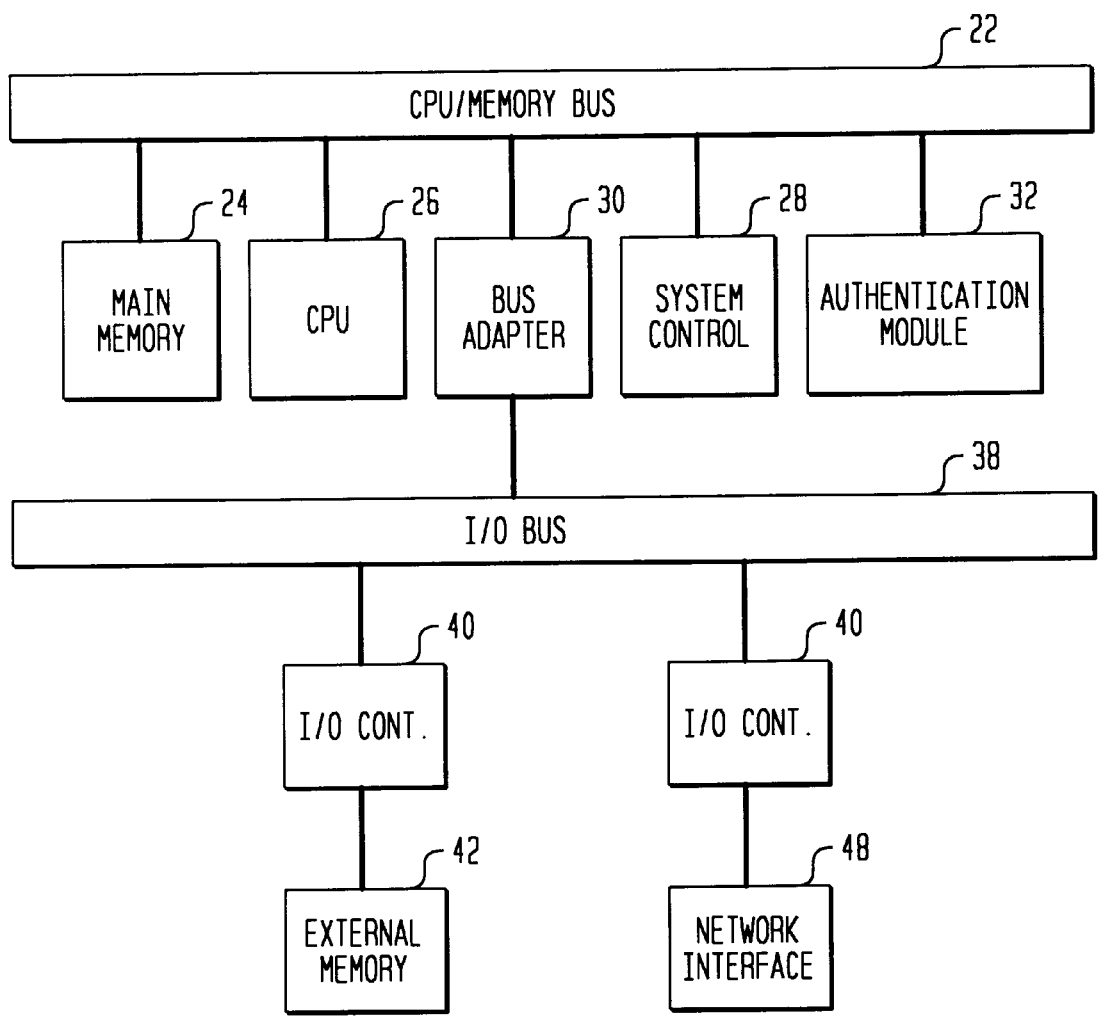

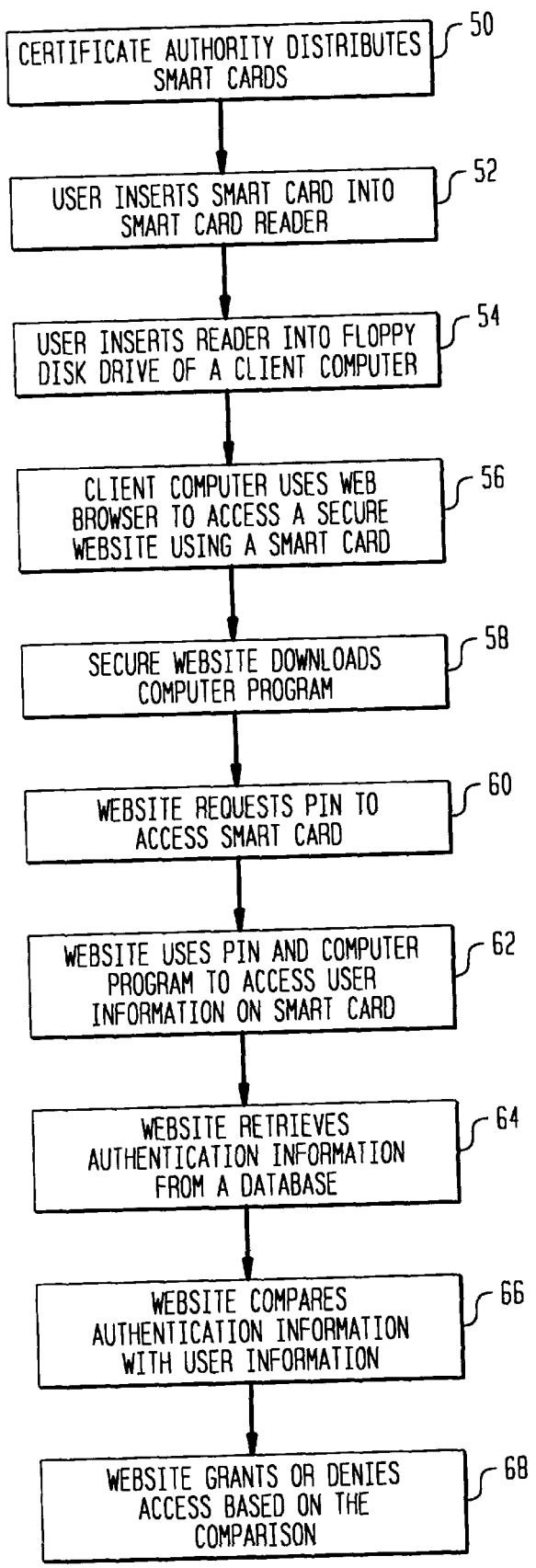

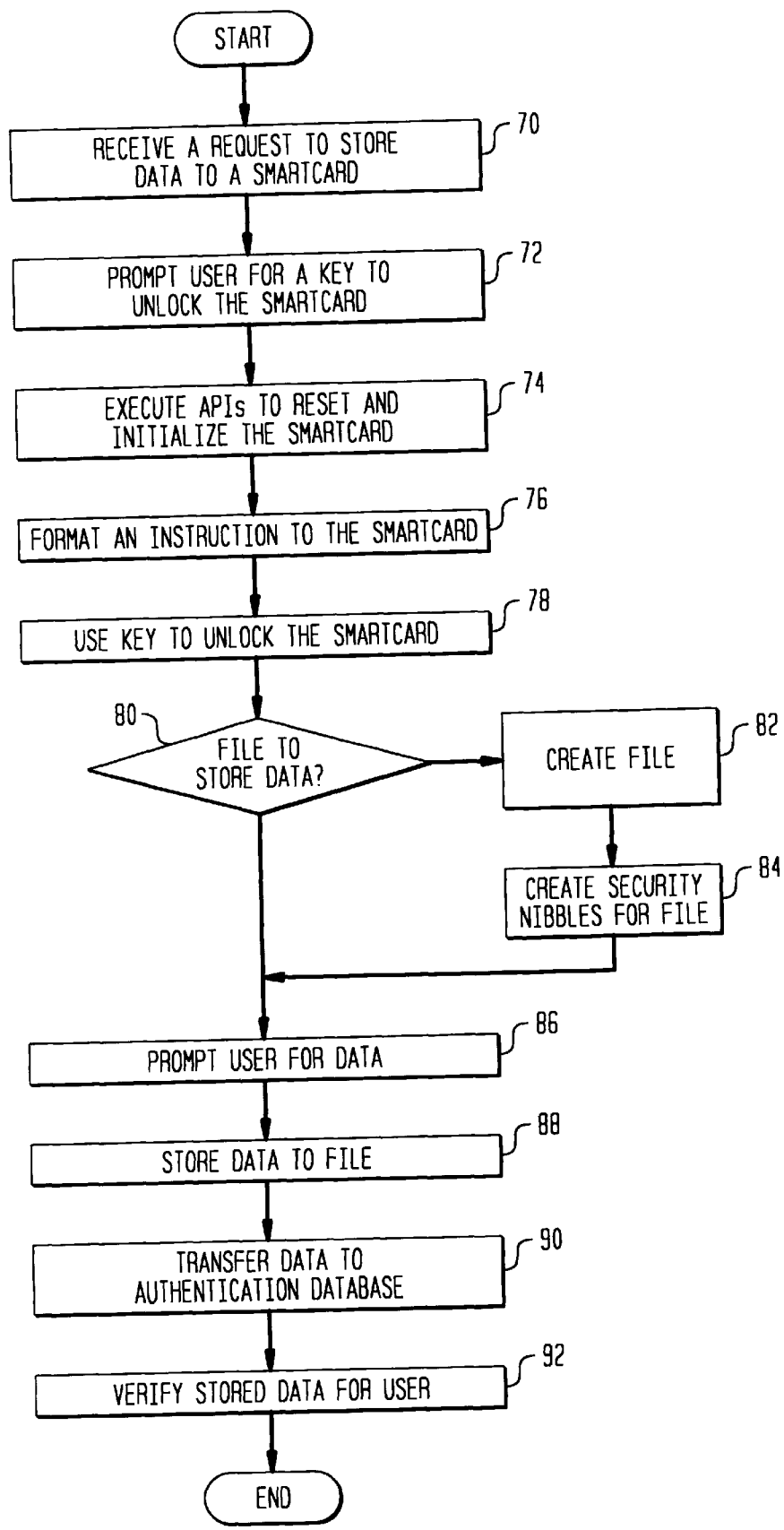

METHOD AND APPARATUS FOR AUTHENTICATING USERS ON A NETWORK USING A SMART CARD

FIELD OF THE INVENTION

The invention relates to a network authentication. More particularly, the invention relates to a method and apparatus for authenticating a user over a network utilizing a smart card and smart card reader.

BACKGROUND OF THE INVENTION

When computers were first developed they were large, relatively slow and incredibly expensive. Since each computer was such a valuable resource, a model was developed wherein a single computer was shared among multiple users. This was accomplished typically by having a central computer and several terminals connected to the central computer, forming a rudimentary network. This network had most of the "intelligence" in the central computer, with the terminals doing little more than giving a user remote access to the computer. Each terminal had, therefore, a minimum amount of processing power, memory and storage capabilities.

One problem with sharing a central computer, however, was that the communications techniques and equipment allowing a remote terminal to access the central computer created a bottleneck in terms of speed and convenience. A user frequently had to wait a long period of time to access a computer program or file stored on the central computer. In addition, a user had to go through a cumbersome and tedious process for receiving permission to use the computer, and logging in to the computer from a remote terminal.

The advent of personal computers changed this computing model. The development of powerful microprocessors, high-speed memory and mass storage devices at relatively modest costs made it possible for each user to have their own personal computer and application software. As a result, a user could avoid using a network to access or retrieve computer information, such as a computer program or data file. Rather, they could simply store this information "locally" on their personal computer.

Recent technological advances in the networking industry, however, have created a movement back to the original concept of shared computer resources. The emergence of high-speed communication networks gives users the same level of convenience when accessing computer information stored at a location remote from the user as when the information is stored at the user's own personal computer. Thus, a user has the advantage of utilizing the computing resources of their personal computer, while also having the benefit of connecting to a network having a wide variety of computing resources attached to it, such as powerful servers having high-speed processors and high-capacity mass storage devices, laser printers, and so forth. Further, a user was not limited to the information stored on their own computer, but could gain access to information stored on hundreds, even thousands, of individual computers linked together by a single network. An example of such networks are the Internet and World Wide Web (WWW).

Consequently, the popularity of the Internet and WWW is increasing at a phenomenal rate due to the fact that these networks provide a user with tremendous computing resources and information. A problem that has consistently plagued the networking industry in general, and the Internet and WWW in particular, however, is the authentication of network users. Invariably, some computers connected to the Internet and WWW contain restricted information that is accessible to only a limited number of users. As a result, it becomes necessary to confirm the identify of a user, and that the user has authorization to access the restricted information. Since the restricted information is stored remotely from the user, the authentication of the user to the access control agent responsible for the security of the restricted information requires an exchange of messages that constitute a user authentication protocol. The authentication protocol permits a user to prove his or her identity to the authentication server (AS) by demonstrating his or her knowledge of a secret, e.g. an access code such as a password or personal identification number (PIN), that is shared with the AS.

User authentication protocols, however, suffer from an inherent exposure to masquerading by malicious intruders. An intruder can spoof, intercept and replay the authentication messages. In cases where a secret is sent in clear text (as in most traditional log-in procedures), simple spoofing and replay is sufficient to break the protocol.

To solve the spoofing problem, various encryption schemes have been developed to encode the secret during transmission. These encoding schemes, however, are unsatisfactory for a number of reasons. For example, a technique has been developed where a user's secret is used as an encryption key or as a seed from which an encryption key is derived. This measure is only partly useful, however, since such an encryption key is weak and can be easily broken by wiretappers. This weakness is due to the lack of randomness in the way users choose their secrets and to a user's difficulty in remembering perfectly random numbers. In other words, the user's secret is chosen out of a space that is relatively small in comparison with the minimum key space required by a good cryptographic algorithm. Typically, the secret is a password chosen from a dictionary the size of which (on the order of 10\*\*5) is by several orders of magnitude smaller than, for example, the one (2\*\*56) required by the Data Encryption Standard (DES) promulgated by the National Bureau of Standards: "Federal Information Processing Standards, Publication 46", 1977. The cryptographic keys derived from such weak secrets can be easily broken by brute force attacks with an exhaustive search in the relatively small key space from which the secret is chosen.

A practical mechanism for recovering strong cryptographic keys using weak secrets without exposure is provided through the use of smart cards. A smart card is a device that is typically the size of a credit card, having a microprocessor and limited storage memory. An example of a smart card is the Cryptoflex(™) smart card by Schlumberger Electronic Transactions. Since a smart card has memory, a smart card can store a strong cryptographic key that is randomly chosen out of the total key space of the cryptographic algorithm in use. The probability of success with a brute force attack based on exhaustive search in the key space becomes negligible due to the strong key. Although the user must typically activate the smart card operation by authenticating himself using a weak initial secret, this interaction takes place directly between the user and the card without any involvement of untrusted media. Thereafter, all data exchanged over the untrusted network is sent under the protection afforded by encryption using the smart card's strong secret. Since the card is a simple device (not unlike a calculator), it is trusted by the principals involved.

A smart card reader is required to access information stored on the smart card. In many instances, the smart card reader is a stand-alone device that attaches to a computer, or is integrated with existing computer hardware such as a keyboard. The problem with such readers is that a separate reader is required for every computer used to access information on a smart card. Further, the reader requires that proprietary software be installed on the computer to read and write information to the smart card.

Recently, a smart card reader has been developed by Fischer International Systems Corporation that is designed to work with the Cryptoflex smart card, and that can be inserted into a conventional 3.5" floppy drive. This reader is referred to as the Fischer Internationalis Smarty(™) smart card reader ("Smarty"). The Smarty removes the need to have a separate reader for every computer used to read and write information to the Cryptoflex smart card. The Smarty, however, requires an Application Interface (API) developed by Fischer to permit a computer to read and write information from a smart card inserted into the Smarty with the Smarty inserted into a computer's 3.5" floppy drive. Thus, the Smarty requires that the API be installed on every computer where the Smarty is used. Further, the Smarty API is designed to work on a personal computer, and not from a remote computer on a network such as a server or "host" computer.

In view of the foregoing, it can be appreciated that a substantial need exists for a method and apparatus for securing network computers having restricted information with smart cards without having to install hardware or software on the client.

SUMMARY OF THE INVENTION

The invention includes a method and apparatus for authenticating a user over a network, with the network having a client computer and a server computer, and the client computer having a smart card and a smart card reader. The client sends a request to the server to access restricted information stored by the server. The server sends smart card interface module; to the client. The server requests an access code from the user to access the smart card. Once the server receives the access code, the server accesses user information stored on the smart card utilizing the program and the access code. The server compares the user information with authentication information available to the server but not the client. If the user information matches the authentication information, the server grants the client access to the restricted information.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 2 is a block diagram of a server computer in accordance with one embodiment of the invention.

FIG. 3 is a block flow diagram of steps performed in accordance with one embodiment of the invention.

FIG. 4 is a block flow diagram of a smart card interface module in accordance with one embodiment of the invention.

DETAILED DESCRIPTION

Figure 1:
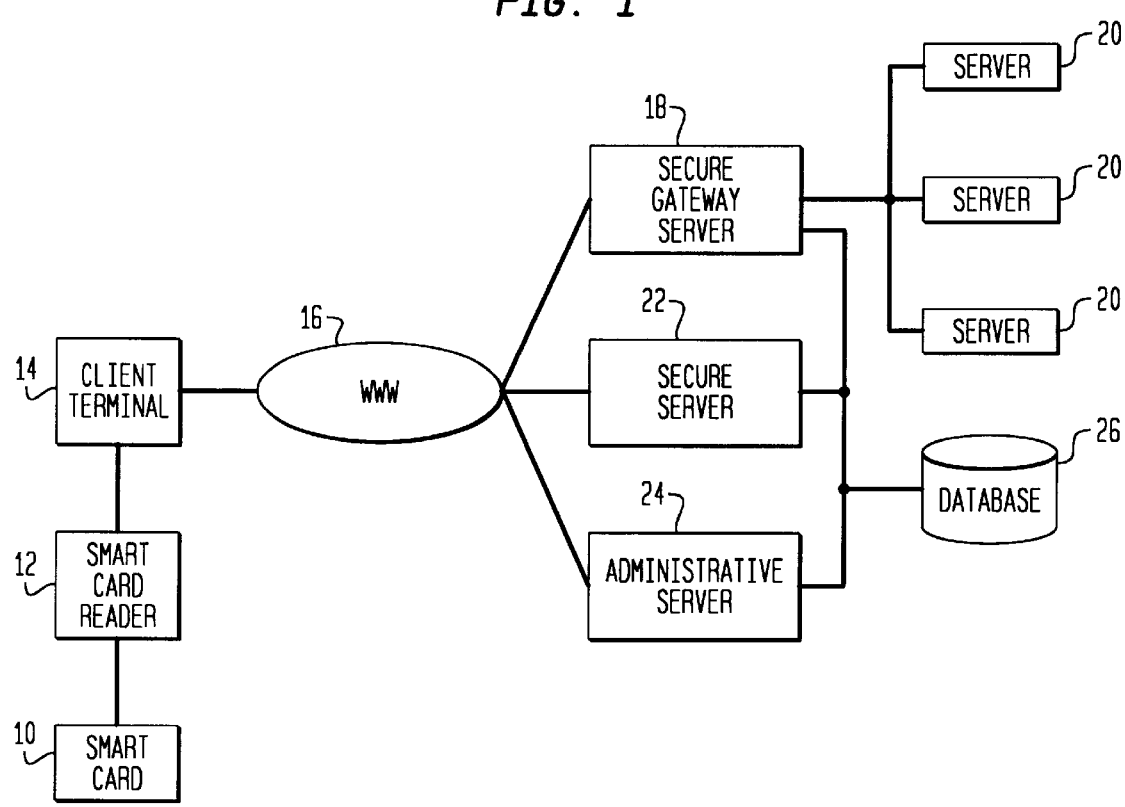
FIG. 1 a diagram of a system suitable for practicing one embodiment of the present invention.

The present invention includes a method and apparatus for authenticating users of a network, such as the Internet or WWW. Each network user is assigned a smart card that can be inserted into a smart card reader, that can in turn be inserted into a 3.5" floppy disk drive of a PC. User information is stored on the smart card. Authentication is accomplished by sending messages from the network (e.g., an Internet web site) to the users's PC to interrogate the smart card.

This embodiment of the invention secures network computers, such as web sites, with smart cards without having to have a user or technician physically go to the PC and install hardware or software on the PC as in conventional authentication systems. Further, this embodiment of the invention permits a user to access and modify user information stored on the issued smart card.

This embodiment of the invention utilizes Cryptoflex smart cards and the Smarty reader. Cryptoflex smart cards are distributed through the mail after setting some initial values for access, e.g., PINs. A user inserts the card into the Smarty, and inserts the Smarty into a 3.5" floppy disk drive of a computer. When the user attempts to access a secure web site, a program is downloaded to the user's computer. The program allows the web site to access the floppy drive that contains the Smarty and smart card. Information from the card is accessed using the program and a PIN, and is compared with server information. Access to the web site will be either allowed or denied based upon the results of the comparison.

Referring now in detail to the drawings wherein like parts are designated by like reference numerals throughout, there is illustrated in FIG. 1 a diagram of a system suitable for practicing one embodiment of the present invention. As shown in FIG. 1, a smart card 10 is inserted into a smart card reader 12. In this embodiment of the invention, smart card 10 is the Cryptoflex smart card, and smart card reader 12 is the Smarty.

Smart card reader 12 is inserted into a 3.5" floppy disk drive of a client terminal 14. Client terminal 14 is a conventional personal computer (PC) having a network connection or modem connection to WWW 16, and browser software such as Netscape Navigator, available from Netscape Communications, Inc., and the Internet Explorer, available from Microsoft, Corp.

Client terminal 14 is in communication with a secure gateway server 18, a secure server 22 and an administrative server 24 via WWW 16. Client terminal 14 uses a web browser to access information stored on servers 18, 20, 22 and 24 via WWW 16 using techniques well-known in the art.

Secure gateway server 18 is in communication with servers 20. Servers 18, 22 and 24 are in communication with a database 26. In this embodiment of the invention, database 26 is a relational database stored on a database computer external to servers 18, 20, 22 and 24. It can be appreciated, however, that database 26 could be stored on servers 18, 20, 22 or 24 and still fall within the scope of the invention.

FIG. 2 is a block diagram of a server computer in accordance with one embodiment of the invention. Secure gateway server 18 comprises a main memory module 24, a central processing unit (CPU) 26, a system control module 28, a bus adapter 30, and an authentication module 32, each of which is connected to a CPU/memory bus 22 and an Input/Output (I/O) bus 38 via bus adapter 30. Further, secure gateway server 18 contains multiple I/O controllers 40, as well external memory 42 and network interface 48, each of which is connected to I/O bus 38 via I/O controllers 40.

The overall functioning of secure gateway server 18 is controlled by CPU 26, which operates under the control of executed computer program instructions that are stored in main memory 24 or external memory 46. Both main memory 24 and external memory 46 are machine readable storage devices. The difference between main memory 24 and external memory 46 is that CPU 26 can typically access information stored in main memory 24 faster than information stored in external memory 36. Thus, for example, main memory 24 may be any type of :machine readable storage device, such as random access memory (RAM), read only memory (ROM), programmable read only memory (PROM), erasable programmable read only memory (EPROM), electronically erasable programmable read only memory (EEPROM). External memory 46 may be any type of machine readable storage device, such as magnetic storage media (i.e., a magnetic disk), or optical storage media (i.e., a CD-ROM). Further, secure gateway server 18 may contain various combinations of machine readable storage devices through other I/O controllers, which are accessible by CPU 26, and which are capable of storing a combination of computer program instructions and data.

CPU 26 includes any processor of sufficient processing power to perform the authentication functionality found in secure gateway server 18. Examples of CPUs suitable to practice the invention includes the INTEL family of processors, such as the Pentium®, Pentium® Pro, and Pentium® II microprocessors.

Network interface 48 is used for communications between secure gateway server 18 and a communications network, such as WWW 16. Network interface 48 supports appropriate signaling functions and voltage levels, in accordance with techniques well known in the art.

I/O controllers 40 are used to control the flow of information between secure gateway server 18 and a number of devices or networks such as external memory 42 and network interface 48. System control module 28 includes human user system control, user interface, and operation. Bus adapter 30 is used for transferring data back and forth between CPU/memory bus 22 and I/O bus 38.

Authentication module 32 implements the main functionality for secure gateway server 18. It is noted that authentication module 32 is shown as a separate functional module in FIG. 2. It can be appreciated, however, that the functions performed by this module can be further separated into more modules, combined with other modules, or be distributed throughout the system, and still fall within the scope of the invention. Further, the functionality of this module may be implemented in hardware, software, or a combination of hardware and software, using well-known signal processing techniques. The operation of authentication module 32 will be described in further detail below with reference to FIG. 3.

FIG. 3 is a block flow diagram of steps performed in accordance with one embodiment of the invention. As shown in FIG. 3, a Certified Authority (CA) distributes smart card 10 to a user at step 50. Smart card 10 stores user information provided by the CA, such as tokens, digital signatures, certificates, tickets, PIN, human resources identification number, and so forth, or personal information provided by the user such as a social security number, birth date, mother's maiden name, etc. Smart card 10 also performs data encryption and decryption functions, stores DES secret keys and digital certificates, and will generate and store public and private RSA cryptographic key pairs. Smart card 10 has an on-board math co-processor that performs the key generation and encryption/decryption calculations.

The user inserts smart card 10 into smart card reader 12 at step 52. Smart card reader 12 in this embodiment of the invention is the Smarty. The Smarty reader looks like a 3.5 inch diskette with a slot in the back that accepts smart card 10.

The user inserts smart card reader 12 into a 3.5 inch floppy disk drive for client terminal 14 to access information stored on smart card 10 at step 54. Smart card reader 12 requires no cables or connectors.

Client computer 14 uses a web browser to access secure gateway server 18 via WWW 16 at step 56. Secure gateway server 18 initiates authentication of the user of smart card 10 using authentication module 32. Authentication module 32 determines whether smart card 10 is present in client terminal 14. If smart card 10 is present in client terminal 14, then authentication module 32 initiates a download of a smart card interface module to client terminal 14 at step 58. The smart card interface module utilizes Active™ controls provided by Microsoft Corporation to create a set of controls for secure gateway server 18 to read and write information to smart card 10 using the API provided by Fischer. The smart card interface module will be described in more detail with reference to FIG. 4.

Once the smart card interface module is downloaded to client terminal 14, client terminal 14 executes the smart card interface module. The smart card interface module begins by modifying parameters for the operating system of client terminal 14 so that the operating system is aware of the software needed to interface with the smart card. The smart card interface module then requests a PIN to access smart card 10 at step 60. Authentication module 32 uses the smart card interface module and the PIN to access and read/write user information from/to smart card 10 at step 62.

Authentication module 32 then retrieves authentication information from database 26 at step 64. In this embodiment of the invention, the authentication information was stored in database 26 by the same CA that issued smart card 10 to the user. An authentication profile is created for every user, with each authentication profile having authentication information that matches the user information stored on smart card 10. The authentication profile can be indexed and maintained using database techniques that are well-known in the art.

Having the user information from smart card 10 and the authentication information from database 26, authentication module 32 compares both sets of information at step 66. If they match, authentication module 32 grants the user access to the restricted information at step 68. If both sets of information do not match at step 66, authentication module 32 denies the user access at step 68.

By requesting a PIN at step 60 and comparing user information with authentication information at step 66, this embodiment of the invention establishes a two-factor security check. This combination decreases the likelihood that someone would be willing or able to gain unauthorized access to the restricted information.

Once a user is authenticated, this embodiment of the invention permits a user access to a local network or intranet. Thus, whenever a user desires to access restricted information stored at various servers protected by secure gateway server 18, the user only has to be authenticated once. Alternatively, a user can be authenticated every time they access a server having restricted information, such as with secure server 22 shown in FIG. 1.

As described above, smart card 10 can store whatever user information a CA desires to use to authenticate the user. Once the CA sends smart card 10 to the user, however, a situation may arise where a user might want to access the user information on smart card 10. This embodiment of the invention, therefore, provides an administrative server 24 that is similar to secure gateway server 18 as described in FIG. 2, but having an administrative module in place of authentication module 32. The administrative module permits a user to store keys, certificates, and other types of user data to smart card 10. In addition, the administrative module allows a user to verify and change a PIN. Any user modifications made at administrative server 24 are replicated to the user's authentication profile stored in database 26.

FIG. 4 is a block flow diagram of a smart card interface module in accordance with one embodiment of the invention. Each step described with reference to FIG. 4 will include specific program code segments for executing each step. More particularly, each step will be described using Visual C++ code designed to operate with ActiveX controls. Although specific program code segments are included herein, it can be appreciated that the functionality of this module may be implemented in hardware, software, or a combination of hardware and software, using well-known signal processing techniques.

It is worthy to note that the specific data being stored and retrieved from the smart card in this example of a smart card interface module is in the form a user's social security number (SSN) for use in authenticating the user. It can be appreciated, however, that any type of data could be stored or retrieved from the smart card, such as tickets, certificates, public/private keys, and so forth.

In this embodiment of the invention, Visual C++ creates a framework for building an ActiveX control. Specific program code segments are then inserted into this framework that are application specific. The specific program code segments for a file "storessnctl.cpp" are listed below. Storessnctl.cpp is created to store key information. The control subclasses the default pushbutton control. A Fischer API header "sos.h" is also listed below, and a Fischer library "sdosm932.lib" is linked into the executable file when the specific program code is actually compiled, thereby permitting call functions such as SOSr_card_reset. The Fischer API's are, of course, well-known in the art and therefore will not be described any further.

The beginning of storessnctl.ccp contains header infomation, event maps, property pages, and constructors/destructors.

```
// StoressnCtl.cpp : Implementation of the CStoressnCtrl ActiveX
Control class.
#include "stdafx.h"
#include "storessn.h"
#include "StoressnCtl.h"
#include "StoressnPpg.h"
#include "EditDialog.h"
#include "EditSsn.h"
#include "sos.h"
#include "wininet.h"
#include "afxinet.h"
#ifdef _DEBUG
#define new DEBUG_NEW
#undef THIS_FILE
static char THIS_FILE[] = __FILE__;
#endif
IMPLEMENT_DYNCREATE(CStoressnCtrl, COleControl)
// Message map
BEGIN_MESSAGE_MAP(CStoressnCtrl, COleControl)
    //{{AFX_MSG_MAP(CStoressnCtrl)
    //}}AFX_MSG_MAP
    ON_MESSAGE(OCM_COMMAND, OnOcmCommand)
    ON_OLEVERB(AFX_IDS_VERB_PROPERTIES,
        OnProperties)
END_MESSAGE_MAP()
// Dispatch map
BEGIN_DISPATCH_MAP(CStoressnCtrl, COleControl)
    //{{AFX_DISPATCH_MAP (CStoressnCtrl)
    DISP_STOCKPROP_CAPTION()
    //}}AFX_DISPATCH_MAP
    DISP_FUNCTION_ID(CStoressnCtrl, "AboutBox",
    DISPID_ABOUTBOX,
    AboutBox, VT_EMPTY, VTS_NONE)
END_DISPATCH_MAP()
// Event map
BEGIN_EVENT_MAP(CStoressnCtrl, COleControl)
    //{{AFX_EVENT_MAP(CStoressnCtrl)
    //}}AFX_EVENT_MAP
END_EVENT_MAP()
// Property pages
BEGIN_PROPPAGEIDS (CStoressnCtrl, 1)
    PROPPAGEID (CStoressnPropPage::guid)
END_PROPPAGEIDS (CStoressnCtrl)
// Initialize class factory and guide
IMPLEMENT_OLECREATE_EX(CStoressnCtrl,
"STORESSN.StoressnCtrl. 1",
0xac78f35a, 0xe690, 0x11d0, 0xa0, 0xe9, 0, 0, 0xc0, 0x99, 0xbc,
0xc8)
// Type library ID and version
IMPLEMENT_OLETYPELIB(CStoressnCtrl, _tlid,
_wVerMajor, _wVerMinor)
// Interface IDs
const IID BASED_CODE IID_DStoressn = { 0xac78f358,
0xe690, 0x11d0, {
0xa0, 0xe9, 0, 0, 0xc0, 0x99, 0xbc, 0xc8 } };
const IID BASED_CODE IID_DStoressnEvents = { 0xac78f359,
0xe690, 0x11d0, { 0xa0, 0xe9, 0, 0, 0xc0,
0x99, 0xbc, 0xc8 } };
// Control type informnation
static const DWORD BASED_CODE _dwStoressnO1eMisc =
    OLEMISC_ACTIVATEWHENVISIBLE |
    OLEMISC_SETCLIENTSITEFIRST |
    OLEMISC_INSIDEOUT |
    OLEMISC_CANTLINKINSIDE |
    OLEMISC_RECOMPOSEONRESIZE;
IMPLEMENT_OLECTLTYPE(CStoressnCtrl, IDS_STORESSN,
_dwStoressnOleMisc)
// CStoressnCtrl::CStoressnCtrlFactory::UpdateRegistry -
// Adds or removes system registry entries for CStoressnCtrl
BOOL CStoressnCtrl::CStoressnCtrlFactory::UpdateRegistry(BOOL
bRegister)
{
    if (bRegister)
        return AfxOleRegisterControlClass(
            AfxGetInstanceHandle (),
            m_clsid,
            m_lpszProgID,
            IDS_STORESSN,
            IDB_STORESSN,
            afxRegApartmentThreading,
            _dwStoressnOleMisc,
            _tlid,
            _wVerMajor,
            _wVerMinor);
    else
        return AfxOleUnregisterClass(m_clsid, m_lpszProgID);
}
// CStoressnCtrl::CStoressnCtrl - Constructor
CStoressnCtrl::CStoressnCtrl()
{
    InitializeIIDs(&IID_DStoressn, &IID_DStoressnEvents);
}
// CStoressnCtrl::~CStoressnCtrl - Destructor
CStoressnCtrl::~CStoressnCtrl()
```

The following specific program code segments actually draws a pushbutton on a web page.

```
// CStoressnCtrl::OnDraw - Drawing function
void CStoressnCtrl::OnDraw(
                CDC* pdc, const CRect& rcBounds, const CRect&
rcInvalid)
        DoSuperclassPaint(pdc, rcBounds);
}
// CStoressnCtrl::DoPropExchange - Persistence support
void CStoressnCtrl::DoPropExchange(CPropExcahnge* pPX)
{
        ExchangeVersion(pPX, MAKELONG(_wVerMinor,
        _wVerMajor));
        COleControl::DoPropExchange(pPX);
}
// CStoressnCtrl::OnResetState - Reset control to default state
void CStoressnCtrl::OnResetState()
{
        COleControl::OnResetState();
}
// CStoressnCtrl::AboutBox - Display an "About" box to the user
void CStoressnCtrl::AboutBox()
{
        CDialog dlgAbout(IDD_ABOUTBOX_STORESSN);
        dlgAbout.DoModal();
}
// CstoressnCtrl preCreateWindow - Modify parameters for
CreateWindowEx
BOOL CStoressnCtrl::PreCreateWindow(CREATESTRUCT& cs)
{
        cs.lpszClass = _T("BUTTON");
        return COleControl::preCreateWindow(cs);
}
// CStoressnCtrl::IsSubclassedControl - This is a subclassed control
BOOL CStoressnCtrl::IsSubclassedControl()
{
        return TRUE;
}
```

A user sends a request to the smart card interface module to read/write data from/to the smart card at step 70. When the user clicks on the pushbutton to execute a secure function, which in this case is to store a SSN on the card, the following BN_CLICKED program code is executed.

```
// CStoressnCtrl::OnOcmCommand - Handle command messages
LRESULT CstoressnCtrl::OnOcmCommand(WPARAM wParam,
LPARAM lParam)
{
#ifdef _WIN32
        WORD wNotifyCode = HIWORD(wParam);
#else
        WORD wNotifyCode = HIWORD(lParam);
#endif
        switch (wNotifyCode)
        {
        case BN_CLICKED:
```

The user is prompted for a key, such as a PIN, to gain access to the smart card at step 72. A dialog box is presented to the user asking for a key to unlock the card so that it can be accessed.

```
        char m_test[100];
        CEditDialog aDlg;
        aDlg.DoModal();
        strcpy(m_test,aDlg.m_test);
        if ((strlen(m_test)) != 16)
        {
            AfxMessageBox("Key must be length of 16");
            break;
        }
```

Some variables are set and Fischer API functions are executed to reset and initialize the smart card at step 74.

```
        ushort length_out;
        char data_new[100];
        char data_out[100];
        short                           result = SUCCESS;
        char resdata[5];
        short                           escape;
        SOS_CARD_TO_HEADER              header;
        short                           bytes;
        uchar                           data_in[9];
        int                             i,x;
        char                            fptr[100];
        int                             rc;
        uchar atr[100];
        ushort atr_length;
        ushort val;
        char cval[2];
        SOSr_card_reset(atr,&atr_length,sizeof(atr));
        AfxMessageBox("Card Reset Success");
        SOSr_card_t0_init(NULL);
        AfXMessageBox("Card Initialization Success");
```

An instruction is formatted for the smart card at step 76. Sscanf is a C function that converts ascii data to hexidecimal, since the smart card only recognizes hexidecimal values. The header format and data follow guidelines set by the International Standards organization (ISO) Standard 7816, which is incorporated by reference herein.

Cla stands for class and defines the class that the instruction belongs to. Ins stands for instruction and defines the instruction that you want the card to execute (like create file, verify key, read file, load certificate, etc). P1, P2, and P3 are parameters to the instructions and mean different things to different instructions (in this case, p1 is not used, p2 is the key number, and p3 is the key length). Following this is a loop that parses through the input data and converts it to hex:

```
        sscanf("f0","%x",&header.cla);
        sscanf("2a","%x",&header.ins);
        sscanf("00","%x",&header.p1);
        sscanf("01","%x",&header.p2);
        sscanf("08","%x",&header.p3);
        x=0;
        for (i=0; i < (strlen(m_test)); i+=2)
        {
            cval[0]=m_test[i];
            cval[1]=m_test[i+1];
            sscanf(cval, "%x",&val);
            data_in[x]=(uchar)val;
            x++;
        }
```

The smart card is accessed at step 78 using the key received from the user at step 72. This example uses a default key to unlock the smart card:

```
        result =SOSr_card_t0_message(&length_out, (uchar *)
        data_out, 100, &header, 8, data_in);
        if (result == SUCCESS)
        }
            //itoa(length_out,resdata,10);
            //AfxMessageBox(resdata);
            sprintf(fptr, "%.2x", data_out[0]);
            if (strcmp(fptr, "ffffff90"))
            {
                sprintf(fptr, "\nBad Key - try
                4746584932567840, RC = %.2x\n",
                data_out[0]);
```

```
                AfxMessageBox(fptr);
                break;
            }
            else
            {
                sprintf(fptr, "Verify of Key on Card
                Complete");
                AfxMessageBox (fptr);
            }
        }
    else {
        sprintf(fptr, "\nDrive Error on Verify, RC =
        %.4x\n", result);
        AfxMessageBox (fptr);
        break;
    }
```

At step 80, the smart card interface module determines whether a file has been created to store user data to the smart card. If a file exists at step 80, step 86 is executed. If a file does not exist at step 80, a file is created at step 82. In this example, the file is created to store a SSN. It can be appreciated, however, that the specific program code segments can be modified to add more specific data, such as public/private keys, and certificates to the card instead of just stored values. Once a file is created, specific hexidecimal "security nibbles" are created at step 84. These security nibbles are used to define access right, key locking, and file invalidating/rehabilitating for users. As discussed previously, all ascii code must be converted to hexidecimal, the proper class, instruction, and parameters must be defined, and a call to the card must be invoked:

```
sscanf("c0","%x",&header.cla);
sscanf("a4","%x",&header.ins);
sscanf("00","%x",&header.p1);
sscanf("00","%x",&header.p2);
sscanf("02","%x",&header.p3);
x=0;
char temp[100]="000d";
for (i=0; i < (strlen(temp)); i+=2)
{
    cval[0]=temp[i];
    cval[i]=temp[i+i];
    sscanf(cval,"%x",&val);
    data_in[x]=(uchar)val;
    x++;
}
result = SOSr_card_t0_message(&length_out, (uchar
*)data_out, 100, &header, 2, data_in);
if (result == SUCCESS) {
    sprintf(fptr. "%.2x", data_out[0]);
    if (strcmp(fptr,"6a"))
    {
        if (strcmp(fptr,"61")) {
        sprintf(fptr, "\nSelect File Failed, RC =
        %.2x\n", data_out[0]);
        AfxMessageBox (fptr);
        break;
        }
        else
        {
            AfxMessageBox("File on Card to Store
            SSN exists, Selected existing File");
        }
    }
    else
    {
        sscanf("f0","%x",&header.cla);
        sscanf("e0","%x",&header.ins);
        sscanf("ff","%x",&header.p1);
```

```
        sscanf("00","%x",&header.p2);
        sscanf("10","%x",&header.p3);
        x=0;
        char                    temp[100]="000000400
                                00d013f00f4000103fff
                                1ff";
        for (i=0; i < (strlen(temp)); i+=2)
        {
            cval[0]=temp[i];
            cval[1]=temp[i+1];
            sscanf(cval,"%x",&val);
            data_in[x]=(uchar)val;
            x++;
        }
        result = SOSr_card_t0_message(&length_out,
        (uchar *)data_out, 100, &header, 16,
        data_in);
        if (result == SUCCESS) {
            sprintf(fptr, "%.2x", data_out[0]);
            if (strcmp(fptr, "ffff90"))
            {
                sprintf(fptr, "\nCreate File
                Failed, RC =%.2x\n",
                data_out[0]);
                AfxMessageBox(fptr);
                break;
            }
            else
            {
            AfxMessageBox("Created File on Card to
            store SSN");
            }
        }
        else
        {
            sscanf(resdata,"%.4x"data_new);
            sprintf(fptr, "\nFile Create Error, RC
            = %.4x\n", result);
            AfxMessageBox(fptr);
            break;
        }
    }
}
else
{
    sscanf(resdata,"%.4x",data_new);
    sprintf(fptr, "\nFile Select Error, RC = %.4x\n",
    result);
    AfxMessageBox(fptr);
    break;
}
```

The user is prompted for the user data at step 86 by a dialog box. The following code request a SSN for the user.

```
char m_ssn[11];
CEditSsn aDlg1;
aDlg1.DoModal();
strcpy(m_ssn,aDlg1.m_ssn);
if ((strlen(m_ssn)) != 9)
{
    AfxMessageBox("Key must be length of 9");
    break;
}
```

At step 88, the data is stored in the selected (or created) file, as follows:

```
m_ssn[10]=m_ssn[9];
m_ssn[9]='0';
m_ssn[10]=NULL;
```

```
sscanf("c0","%x",&header.cla);
sscanf("d6","%x",&header.ins);
sscanf("00","%x",&header.p1);
sscanf("00","%x",&header.p2);
sscanf("05","%x",&header.p3);
x=0;
for (i=0, i < (strlen(m_ssn)); i+=2)
{
    cval[0]=m_ssn[i];
    cval[1]=m_ssn[i+1];
    sscanf(cval,"%x",&val);
    data_in[x]=(uchar)val;
    x++;
}
data_in[5]=NULL;
result = SOSr_card_t0_message(&length_out, (uchar
*)data_out, 100, &header, 5, data_in);
if (result == SUCCESS) {
    sprintf(fptr, "%.2x", data_out[0]);
    if (strcmp(fptr,"ffffff90"))
    {
        sprintf(fptr, "\nUpdate File Failed, RC =
        %.2x\n", data_out[0]);
        AfxMessageBox(fptr);
        break;
    }
    else
        AfxMessageBox("Updated File on Card);
```

The user data is transferred to database 26 at step 90. The following examples uses a File Transfer Protocol (FTP) to transfer the data into a file on database 26. In an advantageous embodiment of the invention, however, the data is transfered using secure sockets protocols to store the data.

```
Cstring   fileName="secfile.txt";
CFile fileInput;
CFileException ex;
    if (!fileInput.Open(fileName,
    CFile::modeCreate | CFile::modeReadWrite,
    &ex))
    {
        TCHAR szCause[255];
        ex.GetErrorMessage(szCause, 255);
        AfxMessageBox(szCause);
    }
    else
    {
        fileInput.Write(aDlg1.m_ssn,9);
        fileInput.Close();
    }
HINTERNET handle;
LPCTSTR app="Microsoft Internet Explorer";
DWORD access=INTERNET_OPEN_TYPE_PRECONFIG;
DWORD flag=NULL;
if ((handle =
InternetOpen(app,access,NULL,NULL,0)) == NULL)
    AfxMessageBox("OPEN ERROR");
HINTERNET handle1;
LPCTSTR server="ohj740_kelva.qp.att.com";
INTERNET_PORT
port=INTERNET_INVALID_PORT_NUMBER;
DWORD service=INTERNET_SERVICE_FTP;
DWORD context;
if ((handle1 =
InternetConnect(handle,server,port,NULL,NULL,servi
ce,INTERNET_FLAG_PASSIVE,0)) == NULL)
    AfxMessageBox("CONNECT ERROR");
HINTERNET handle2;
DWORD ftpacc=GENERIC_WRITE;
DWORD ftpflag=FTP_TRANSFER_TYPE_BINARY;
CString inp="c:\\temp\\";
if
((!FtpPutFile(handle1,"secfile.txt","secfile.txt",
FTP_TRANSFER_TYPE_BINARY,0)))
{
            LPVOID lpMsgBuf;
FormatMessage(FORMAT_MESSAGE_ALLOCATE_BUFFER |
FORMAT_MESSAGE_FROM_SYSTEM,NULL,GetLastError(),
            MAKELANGID(LANG_NEUTRAL,
SUBLANG_DEFAULT),(LPTSTR) &lpMsgBuf,0,NULL);
            AfxMessageBox((char *)lpMsgBuf);
}
else
    AfxMessageBox("Put SSN in file on Server");
}
else
{
    sscanf(resdata,"%.4x"data_new);
    sprintf(fptr, "\nFile Update Error, RC = %.4x\n",
    result);
    AfxMessageBox (fptr);
    break;
}
```

At step 92, the data is read back to the user for verification:

```
sscanf("c0","%x",&header.cla);
sscanf("b0","%x",&header.ins);
sscanf("00","%x",&header.p1);
sscanf("00","%x",&header.p2);
sscanf("05","%x",&header.p3);
result = SOSr_card_t0_message(&length_out, (uchar
*)data_out, 100, &header, 0, NULL);
fptr[0]=NULL;
if (result == SUCCESS) {
    for (i=0; i < length_out; i++)
    {
        sprintf(cval, "%.2x", data_out[i]);
        strcat(fptr,cval);
    }
    if (strncmp(&fptr[10],"ffffff9",7))
    {
        sprintf(fptr, "\nRead File Failed, RC =
        %.2x\n", data_out[0]);
        AfxMessageBox(fptr);
        break;
    }
    else
    fptr[9]=NULL;
    sprintf(data_new, "\nVerify Read of SSN from
    Card:%s\n",fptr);
    AfxMessageBox(data_new);
}
else
{
    sprintf(fptr, "\nFile Read Error, RC = %.4x\n",
    result);
    AfxMessageBox(fptr);
    break;
}
break;
}
return 0;
}
```

Although various embodiments are specifically illustrated and described herein, it will be appreciated that modifications and variations of the present invention are covered by the above teachings and within the purview of the appended claims without departing from the spirit and intended scope of the invention. For example, although one embodiment of the invention utilizes a SSN to authenticate a user, it can be appreciated that any type of user data can be used and still fall within the scope of the invention. In another example, although specific functions were enumerated for the authentication module and smart card interface module, it can be appreciated that the functions for each separate module could be combined into a single module, or separated into additional modules, and still fall within the scope of the invention.

What is claimed is:

1. A method for authenticating a user over a network, with the network having a client computer and a server computer, and the client computer having a smart card reader for receiving a smart card, comprising the steps of:

receiving a request from the client to access restricted information stored by the server;

sending a smart card interface program from the server to the client;

receiving an access code from the user to access the smart card;

accessing user information stored on the smart card utilizing said program and said access code;

comparing said user information with authentication information available to the server; and granting the client access to said restricted information if said user information matches said authentication information.

2. The method of claim 1, wherein said smart card interface module utilizes Active X controls.

3. The method of claim 1, wherein said access code is a personal identification number.

4. The method of claim 1, wherein said step of comparing comprises the steps of:

searching a database for said authentication information;

retrieving said authentication information; and determining whether said user information matches said authentication information.

5. The method of claim 4, wherein said database is stored on the server.

6. The method of claim 4, wherein said database is stored on a database computer.

7. The method of claim 1, wherein said restricted information is stored on the server.

8. The method of claim 1, wherein said restricted information is stored on another server.

9. A method for authenticating a user over a network, with the network having a client computer and a server computer, and the client computer having a smart card reader for receiving a smart card, comprising the steps of:

sending smart card interface program from the server to the client;

receiving a request to store user data on the smart card;

prompting a user for a key to access the smart card;

initializing the smart card;

formatting instructions to the smart card;

accessing the smart card using said key;

prompting the user for said user data;

storing the user data to a file; and verifying the stored user data for the user.

10. An apparatus authenticating a user over a network, with the network having a client computer and a server computer, and the client computer having a smart card reader for receiving a smart card, comprising:

means for receiving a request from the client to access restricted information stored by the server;

means for sending a computer program from the server to the client;

means for receiving an access code from the user to access the smart card;

means for accessing user information stored on the smart card utilizing said program and said access code;

means for comparing said user information with authentication information available to the server; and means for granting the client access to said restricted information if said user information matches said authentication information.

11. The apparatus of claim 10, wherein said means for comparing comprises:

means for searching a database for said authentication information;

means for retrieving said authentication information; and means for determining whether said user information matches said authentication information.

12. An apparatus for authenticating a user over a network, with the network having a client computer and a server computer, and the client computer having a smart card reader for receiving a smart card, comprising:

means for sending a smart card interface program from the server to the client;

means for receiving a request to store user data on the smart card;

means for prompting a user for a key to access the smart card;

means for initializing the smart card;

means for formatting instructions to the smart card;

means for accessing the smart card using said key;

means for prompting the user for said user data; and means for storing the user data to a file.

13. The apparatus of claim 12, further comprising means for verifying the stored user data for the user.

14. A computer for authenticating a user over a network, comprising:

a memory containing:
        a smart card interface program received from a server computer over the network having functions for accessing a smart card over the network to authenticate a user;
        a client computer program for invoking one of the functions of the server computer program; and a processor for running said smart card interface program and said client computer program.

15. A computer readable medium having stored thereon instructions which, when executed by a processor, cause the processor to perform steps for authenticating a user over a network using a smart card, said steps comprising:

receiving a request from a client computer to access restricted information stored by a server computer;

sending a smart card interface program from said server to said client;

receiving an access code from the user to access the smart card;

accessing user information stored on the smart card utilizing said program and said access code;

comparing said user information with authentication information available to said server; and granting said client access to said restricted information if said user information matches said authentication information.

16. The computer-readable medium of claim 15, wherein said smart card interface program utilizes Active X controls.

17. The computer-readable medium of claim 15, wherein said access code is a personal identification number.

18. The computer-readable medium of claim 15, wherein said step of comparing comprises the steps of:

searching a database for said authentication information;

retrieving said authentication information; and determining whether said user information matches said authentication information.

19. The computer-readable medium of claim 18, wherein said database is stored on said server.

20. The computer-readable medium of claim 18, wherein said database is stored on a database computer.

21. The computer-readable medium of claim 15, wherein said restricted information is stored on said server.

22. The computer-readable medium of claim 15, wherein said restricted information is stored on another server.

23. An apparatus authenticating a user over a network, comprising:

a smart card having authentication information stored therein;

a smart card reader coupled to said smart card;

a client computer coupled to said smart card reader;

a server computer in communication with said client computer over the network, said server computer controlling access to restricted information;

means for reading authentication information from said smart card, and writing authentication information to said smart card, by said server; and means for authenticating the user by said server using authentication information stored on said smart card, and if authenticated, permitting access to said restricted information.

\* \* \* \* \*